Patented July 5, 1949

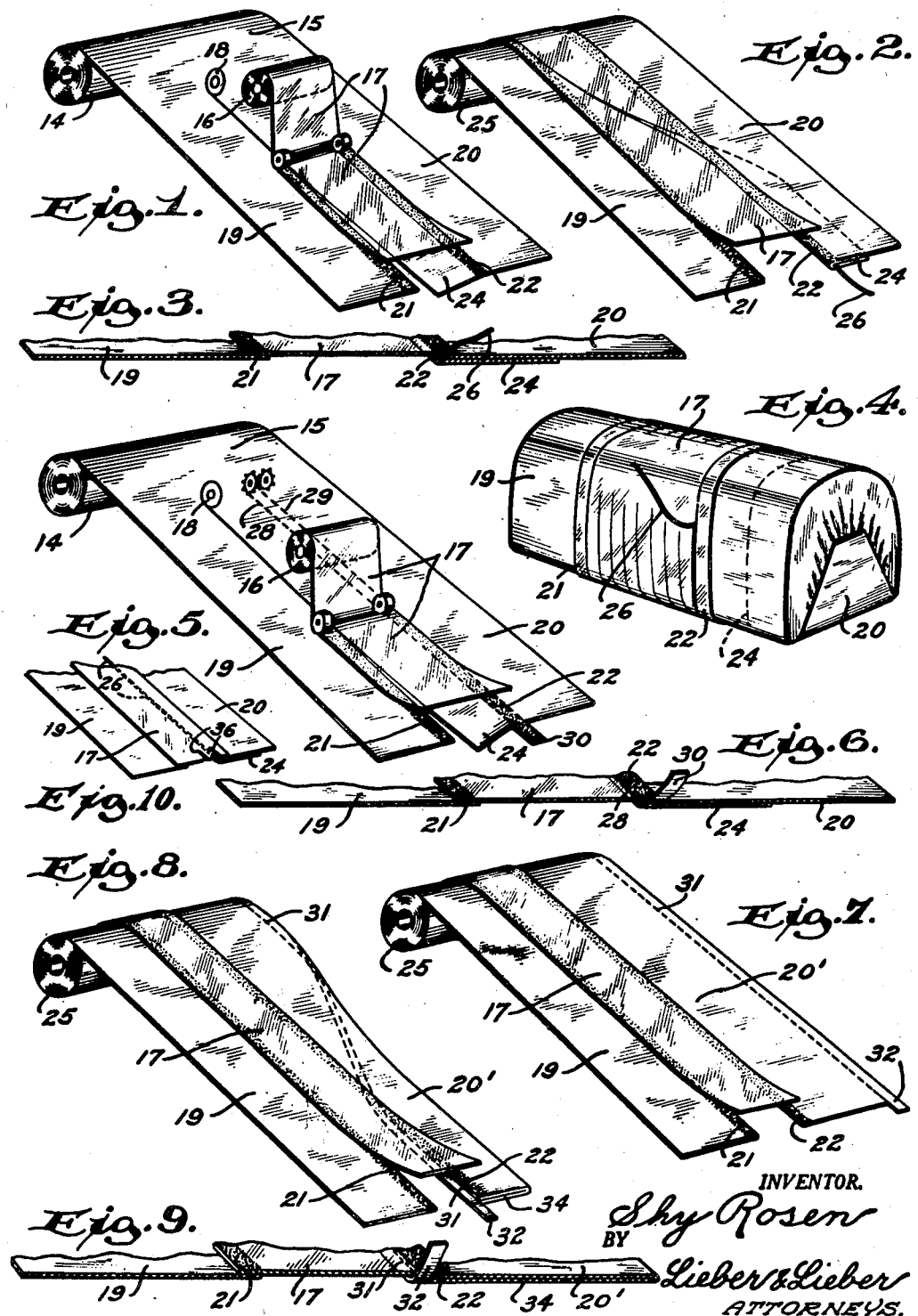

2,475,052

UNITED STATES PATENT OFFICE 2,475,052

ART OF MANUFACTURING COMPOSITE COMMODITY WRAPPERS

Shy Rosen, New York, N. Y., assignor to Milprint, Inc., Milwaukee, Wis., a corporation of Delaware Application September 8, 1947, Serial No. 772,701

3 Claims. (Cl. 229—87)

1

The present invention relates generally to improvements in the art of producing commodity wrappers, and relates more specifically to an improved reclosable bread wrapper of the general type shown in my copending applications Serial No. 681,501, filed July 5, 1946, and Serial No. 718,693, filed December 27, 1946, and to an improved mode of manufacturing such composite wrappers.

In my prior applications above identified, I have proposed an improved wrapper for loaves of bread or the like, consisting primarily of a flexible composite wrapper sheet snugly embracing each loaf and having a reenforcing sheet or strip surrounding the medial portion of the commodity, and wherein the wrapper is separable into two complementary cup-shaped sections along an edge of the reenforcing strip by means of an elongated tear thread or element so that the reenforcing sheet is carried by the brim of one section and is telescopically cooperable with the brim of the other section to reclose the package whenever bread slices are removed. This improved type of bread wrapper has met with considerable commercial success, but in all of the previous embodiments shown in said prior applications, the reenforcing strip was a separate member adhesively attached either externally or internally to one section of each wrapper, thus making it rather inconvenient to handle and to finally position and apply the loose reenforcing members at the source of production of the wrappers.

In accordance with my present improvement, I have discovered a mode of producing such telescopic reclosable bread wrappers by forming the reenforcing strip integral with one of the separable sections of each wrapper, and in such manner that the ultimate user of these wrappers may conveniently and properly position these reenforcing members relative to their final supporting or carrying sections.

It is therefore a primary object of the present invention to provide an improved reclosable composite bread wrapper of the telescopic separable section type, which is composed of a minimum number of parts while being conveniently applicable to the commodity to effectively reclose the same.

Another object of my invention is to provide an improved telescopically reclosable wrapper for loaf-like commodity such as sliced bread loaves, which may be manufactured and sold at very moderate cost, and which may also be readily assembled for commercial use either at the factory or at the commodity wrapping zone such as a bakery.

A further object of the invention is to provide an exceedingly simple separable and reclosable section wrapper for commodities which are normally removed and consumed in batches such as slices, which is adapted to be quickly and conveniently opened and reclosed after each removal of a batch of the confined material.

Still another specific object of this invention is to provide a simplified mode of producing composite wrappers for bread loaves or the like, in a manner whereby the cost of manufacture thereof is minimized while the speed of production is materially facilitated and enhanced.

These and other objects of my present improvement will be apparent from the following detailed description.

A clear conception of the features constituting this improvement, and of the mode of constructing and of utilizing several types of reclosable bread wrappers embodying the present invention, may be had by referring to the drawing accompanying and forming a part of this specification wherein like reference characters designate the same or similar parts in the various views.

Fig. 1 is a diagrammatic perspective view illustrating the initial steps involved in the production of one type of my present improved reenforced and reclosable bread wrapper, which are preferably performed at the wrapper stock manufacturing plant;

Fig. 2 is a similarly diagrammatic perspective view showing the mode of converting the wrapping material resulting from the procedure depicted in Fig. 1, into final wrapper stock ready for use;

Fig. 3 is an enlarged transverse section through the final bread wrapping stock produced in accordance with Figs. 1 and 2;

Fig. 4 is a perspective view of a loaf of sliced bread enclosed in the wrapper of Fig. 3, and showing the tear element or thread for separating the wrapper into sections, partially removed;

Fig. 5 is a diagrammatic perspective view, similar to that of Fig. 1, but illustrating a method of producing a modified wrapping stock having the reenforcing strip and the separating element or strip, formed directly out of one of the original wrapper sheets;

Fig. 6 is an enlarged transverse section through the final bread wrapping stock produced in accordance with Fig. 5;

Fig. 7 is a diagrammatic perspective view illustrating a roll of further modified wrapping stock also having the reenforcing strip and the separating element or strip, formed directly out of or integral with one of the original wrapper sheets;

Fig. 8 is a similarly diagrammatic perspective view showing the manner of converting the composite wrapping stock of Fig. 7 into final stock ready for use;

Fig. 9 is an enlarged transverse section through the final bread wrapping stock produced in accordance with Figs. 7 and 8; and Fig. 10 is another diagrammatic perspective view showing a modified method of forming wrapper stock similar to that shown in Figs. 1 to 4 inclusive, and an improved mode of forming the accessible end of the tear element.

While the invention has been shown and described herein as having been applied to produce bread wrappers each having two opaque end sections interconnected by an intervening transparent or window section adapted to encircle the commodity loaf, it is not my desire or intention to unnecessarily limit the scope or utility of the improvement by virtue of this restricted disclosure, since the improved features may also be more generally employed in composite wrappers comprising two separable and reclosable sections formed of diverse materials.

In accordance with my present improvement, I provide a flexible wrapper for sliced bread loaves or the like, comprising a unitary composite sheet normally snugly embracing and enclosing the loaf, and being composed of several flexible individual sheets secured together along their adjacent marginal edges, one of these marginal edges of one sheet being reenforced by a strip formed integral with the sheet and folded thereagainst, and an elongated flexible tear element associated with the wrapper and being removable to separate the sheets along the united marginal edges thereof so as to provide two complementary cup-shaped sections adapted to be telescoped over each other in order to reclose the package. The formation of the reenforcing strip integral with one of the marginally united sheets, is an important feature of this invention since it reduces to a minimum the number of parts of the composite wrapper, and it also facilitates formation or application of the tearing element, while additionally reducing the cost of production of these wrappers. Such a reinforcing strip along the marginal edge or brim of one of the separated cup-shaped divisions of the opened package, is very desirable as it permits more convenient telescoping of the two sections during reclosing and also more thoroughly seals the joint between the reclosed sections. The element for separating or tearing the sections apart may be either a thread or a flexible strip, and in the latter case the strip may also be formed integral with one of the composite sheets of the wrapper.

Referring specifically to Figs. 1 to 4 inclusive, the improved bread wrapper and method of production shown therein, involves the use of a supply roll 14 of flexible but rather heavy and relatively tenacious wrapper stock 15, and another supply roll 16 of flexible but rather thin and more readily tearable wrapper stock 17, both of which may be continuously withdrawn from their supply rolls 14, 16 in flat ribbon form and in superimposed relationship, as illustrated in Fig. 1. However, before the ribbons are superimposed, the advancing stock 15 is severed by a cutter 18 into two sections 19, 20, and immediately following the application of the stock 17 to these severed sections 19, 20, the opposite marginal edges of the ribbon 17 are either heat sealed or otherwise adhesively united with the sections 19, 20 along elongated areas 21, 22 the former of which extends along the inner marginal edge of the section 19 and the latter of which extends along a medial portion of the section 20 and forms an elongated reenforcing strip 24 formed integral with the section 20.

The reenforcing strip 24 thus provided underlies but is not attached to the thin stock section 17 of the composite ribbon, and this ribbon which is preferably produced at the factory of origin, may be rolled into composite stock supply rolls 25 of suitable size which may be shipped to the bakery or other place of ultimate utilization. Here the composite wrapper stock may be continuously withdrawn from the supply roll 25, and the reenforcing strip 24 may be folded back against the inner surface of its carrying section 20, while an elongated tear element such as a cord or strong thread 26 is inserted within the fold near the adjacent marginal edge of the medial section 17, as depicted in Fig. 2. The reenforcing strip 24 may be either heat sealed or otherwise adhesively connected to the inner surface of the section 20, and the composite wrapper sheet may thereafter be cut into suitable lengths ready for use, but one end of each severed tear element or thread 26 may be permitted to protrude slightly from each wrapper as shown in exaggerated condition in Fig. 3.

Each completed composite but unitary flexible wrapper may subsequently be applied to a loaf of commodity such as sliced bread, as illustrated in Fig. 4, wherein the final wrapper snugly embraces and completely encloses the loaf while the medial wrapper section 17 surrounds the midportion of the bread, and one end of the tear element 26 remains accessible from the exterior of the package. The outer ends of the wrapper sections 19, 20 are folded over and either heat sealed or adhesively closed, so as to hermetically seal the contents, but the package may be conveniently opened by merely pulling on the exposed end of the thread 26 and causing it to segregate the wrapper into two complementary cup-shaped sections or caps, one comprising the sections 19, 17, and the other consisting of the section 20 which is internally reenforced along the segregating line by the strip 24 attached thereto. The tear thread or element 26 may be readily removed by tearing it through the fold of the wrapper section 20 and through the relatively thin stock or section 17 along the joined marginal edges of these two adjoining sections; and after a desired number of slices of bread have been removed, the package may be promptly reclosed and sealed to preserve and protect the residual contents, by merely telescoping the reenforced brim of the cup section 20 over the torn free edge of the thin stock section 17.

While the embodiment of Figs. 1 to 4 inclusive, involves the use of a separate tear element or thread 26 for the purpose of segregating the final wrapper into complementary cup-shaped sections, the tearing element may also be formed integral with one of the wrapper sections, as indicated in Figs. 5 and 6. In accordance with this modified embodiment of my invention, a supply roll 14 of flexible but rather heavy and relatively tenacious wrapper stock 15, and another supply roll 16 of flexible but rather thin and more readily tearable wrapper stock 17, may likewise be provided and the stock 15, 17 may be constantly withdrawn in superimposed ribbon formation and in superimposed relationship, as shown in Fig. 5. But before the ribbons are superimposed and united, the advancing stock 15 is severed by a cutter 16 into two sections 19, 20 and the section 20 is simultaneously provided with two parallel lines of perforations 28, 29 forming an elongated tear element or strip 30 and a reenforcing strip 24 both formed integral with the section 20. Immediately thereafter, the strip section 17 is superimposed upon and is united with the adjacent marginal edges of the outer sections 19, 20 along elongated areas 21, 22 the former of which extends along the inner marginal edge of the section 19 while the latter extends along the outer surface of the tear strip 30, the reenforcing strip 24 however remaining free from attachment to the intermediate strip 17.

The reenforcing strip 24 thus provided underlies the thin medial section 17 of the composite stock ribbon, and this strip 24 may subsequently be folded against the adjacent inner surfaces of the strip 30 and section 20 and secured to the latter alone, either at the factory of origin or at the bakery or other place of final utilization of the stock. As in the case of Figs. 1 to 4 inclusive, the final composite stock of Figs. 5 and 6 may be cut into successive wrappers of any desired length, but one end of the tear strip 30 of each length should be allowed to project beyond the end of the wrapper as shown in Fig. 6, so that it may be readily grasped for tearing purposes. Each of the final modified wrappers may thereafter be applied to commodity such as a loaf of sliced bread, in the manner depicted in Fig. 4 and as hereinbefore described; and when the tear strip 30 is removed, it will tear out an elongated strip of the thin section 17 adhesively applied thereto along the area 22, and will thus segregate the wrapper into two complementary cup-shaped sections or caps adapted to be reclosed by telescoping the reenforcing strip 24 at the brim of one cup over the brim of the other. In this modification, each composite wrapper comprises only three individual parts, and no separate tear element or thread 26 is necessary.

Both of the embodiments of Figs. 1 to 4 and Figs. 5 and 6, involve the use of reenforcing strips 24 formed integral with the marginal edges of the sections 20 which adjoin the intermediate wrapper section 17, but the integral reenforcing strip may also be otherwise formed as illustrated in Figs. 7, 8 and 9. In this further modified embodiment of the present invention, stock supply rolls of material such as previously described may be severed and united along areas 21, 22 to provide a continuous composite stock ribbon comprising end esctions 19, 20' and an intervening wrapper section 17, of which the end section 20' is considerably wider than the opposite end section 19 and is provided with a row of perforations 31 forming a tear element or strip 32, as shown in Fig. 7. This composite ribbon stock may subsequently be folded in the manner depicted in Fig. 8, to cause the portion of the end section 20' nearest the tear strip 32 to assume a position underlying the section 20'; and to provide a reenforcing strip 34 formed integral with its carrying section.

The reenforcing strip 34 thus produced may be adhesively connected to the inner surface of the wrapper section 20' either at the source of production or at the place of final utilization of the wrappers, but the tear strip 32 should preferably be disposed beyond the inner edge of the end section 20' beneath the adjacent marginal edge of the medial section 17, while one end of each tear strip 32 should be allowed to protrude slightly for gripping purposes, beyond the end of each final wrapper which is cut from the completed composite ribbon, as shown in Fig. 9. However, in order to avoid protrusion of the tear elements beyond the ends of the severed wrappers, the severed ends may be provided with notches 36 at the opposite side of each tear strip or element 26 as shown in Fig. 10, wherein the tear thread has been heat sealed to the interior of the section 17. These various modified wrappers may subsequently be applied to loaf-like commodity such as sliced bread in the manner previously described, and each package may be quickly opened by removing the tear element, but may also be readily reclosed and resealed by telescoping the reenforcing strips 24, 34 carried by one of the complementary cup-shaped sections 20, 20' over the brim of the other cup-section 17, 19. The wrapper stock of Figs. 8 and 9 may likewise be produced from only three individual parts and without utilizing a separate tear element, since both the tear strip 32 and the reenforcing strip 34 are formed integral with the end section 20'.

In each of the four embodiments of the invention shown and described herein, the reenforcing strip for the closure section of the package, is formed integral with the closure cap, and thus greatly facilitates production of the composite wrappers by avoiding necessity of handling separate reenforcing strips or ribbons during fabrication of the wrappers. This construction also eliminates danger of having the reenforcing strips torn off before the wrappers are finally utilized, and by also forming the tear elements or strips integral with the adjacent main wrapper sections as in Figs. 6 and 9, production of these composite wrappers is further simplified and facilitated. This latter construction reduces to a minimum the number of individual parts required to complete the wrappers, and the integral tear strip 30, 32 may be formed either at the outer edge of the end section 20' as in Fig. 9 or at the inner edge of the section 20 as in Fig. 6, while the reenforcing strip 24, 34 may be formed integral with either edge of the same end section. While the several wrappers specifically illustrated are composed of two end sections formed of relatively opaque wax coated paper, and of a medial section formed of relatively transparent regenerated cellulose, these specific materials need not necessarily be utilized, but the material of the end sections should be relatively strong and tenacious as compared to that of the intermediate section.

From the foregoing detailed description it will be apparent that my present invention provides an improved wrapper for commodity such as sliced bread which is adapted to be dispensed piece meal, which is capable of being conveniently opened and effectively reclosed after each removal of a batch of the package contents, so as to seal and protect the residual commodity. The provision of the reenforcing strip formed integral with one of the end cap sections, not only reduces the number of parts required in the production of the composite wrappers, but also produces a more durable and rigid closure cap for reclosing the package; and by forming the tear strip integral with one of the end sections of the wrapper, the number of individual parts is reduced to a minimum and the cost of production is correspondingly reduced. The invention thus provides a mode of producing composite wrappers of this type which are exceedingly simple and durable in construction, and which may be readily fabricated with simple equipment at a rapid rate and for diverse uses; and while each of the improved wrappers specifically shown and described, comprises three interconnected sections, only two such sections are necessary in order to attain the objects and advantages of my invention. The composite wrappers are preferably formed of flexible wrapper stock adapted to be joined by heat sealing in a well known manner, so as to provide enclosures which snugly embrace and hug loaf-like commodity of varying shapes, and may be advantageously utilized for the dispensation and reenclosure of diverse commodities.

It should be understood that it is not desired to limit this invention to the exact details of construction or to the precise mode of production of the wrappers, herein shown and described, for various modifications within the scope of the appended claims may occur to persons skilled in the art; and it is also contemplated that specific descriptive terms used herein be given the broadest possible interpretation consistent with the disclosure.

I claim:

1. A flexible wrapper for sliced bread loaves or the like, comprising, a composite flexible sheet snugly embracing and enclosing a bread loaf and being composed of at least two edge to edge overlapping sheets one of which consists of stiffer flexible material than the other and the adjacent overlapped edges of which surround the loaf and are secured together, a reinforcing strip formed integral with an edge of said stiffer sheet and being folded thereagainst and secured to said overlapped sheet edges, and an elongated flexible tear element associated with said reinforcing strip and with said stiffer sheet at said overlapped sheet edges and being progressively removable to tear away the overlapped edge portion of the more flexible sheet in order to gain access to the loaf by separating the wrapper into two complementary flexible cup-shaped sections, the brim of the stiffer cup section being further stiffened by the reinforcing strip so as to facilitate telescopic reclosing and sealing of the package.

2. A flexible wrapper for sliced bread loaves or the like, comprising, a composite flexible sheet snugly embracing and enclosing a bread loaf and being composed of at least two edge to edge overlapping sheets one of which consists of stiffer flexible material than the other and the adjacent overlapped edges of which surround the loaf and are secured together, a reinforcing strip formed integral with an edge of said stiffer sheet and being folded thereagainst and secured to said overlapped sheet edges, and an elongated tear strip formed integral with said reinforcing strip and being cooperable with the overlapped edge portions of said sheets and progressively removable to tear away said edge portion of the more flexible sheet in order to gain access to the loaf by separating the wrapper into two complementary flexible cup-shaped sections, the brim of the stiffer cup section being further stiffened by the reinforcing strip so as to facilitate telescopic reclosing and sealing of the package.

3. A flexible wrapper for sliced bread loaves or the like, comprising, a composite flexible sheet snugly embracing and enclosing a bread loaf and being composed of at least two edge to edge overlapping sheets one of which consists of stiffer flexible material than the other and the adjacent overlapped edges of which surround the loaf and are secured together, a reinforcing strip formed integral with the free edge of the overlapped region of said stiffer sheet and being folded against and secured to said sheet adjacent to said free edge, and an elongated tear strip formed integral with said reinforcing strip and being cooperable with the overlapped edges of both sheets and progressively removable to tear away said edge portion of the more flexible sheet in order to gain access to the loaf by separating the wrapper into two complementary flexible cup-shaped sections, the brim of the stiffer cup section being further stiffened by the reinforcing strip so as to facilitate telescopic reclosing and sealing of the package.

SHY ROSEN.

REFERENCES CITED

The following references are of record in the file of this patent:

UNITED STATES PATENTS

| Number | Name | Date |
|---|---|---|
| 1,725,869 | Kornsweet | Aug. 27, 1929 |
| 1,827,636 | Ames | Oct. 13, 1931 |
| 2,005,665 | Saignier | June 18, 1935 |
| 2,106,748 | Karnes et al. | Feb. 1, 1938 |
| 2,296,951 | Rosen et al. | Sept. 29, 1942 |